(12) United States Patent
Iwane et al.

(10) Patent No.: US 7,825,981 B2
(45) Date of Patent: Nov. 2, 2010

(54) HIGH-POLYMER OPTICAL LOW-PASS FILTER, METHOD FOR PRODUCING HIGH-POLYMER OPTICAL LOW-PASS FILTER, AND DIGITAL CAMERA

(75) Inventors: Toru Iwane, Yokohama (JP); Takashi Matsubara, Yokosuka (JP)

(73) Assignee: Nikon Corporation, Tokyo (JP)

( * ) Notice: Subject to any disclaimer, the term of this patent is extended or adjusted under 35 U.S.C. 154(b) by 1585 days.

(21) Appl. No.: 10/685,409

(22) Filed: Oct. 16, 2003

(65) Prior Publication Data
US 2004/0080659 A1    Apr. 29, 2004

(30) Foreign Application Priority Data
Oct. 17, 2002    (JP)    ............... 2002-303257

(51) Int. Cl.
H04N 5/225    (2006.01)
G02F 1/00    (2006.01)
(52) U.S. Cl. ...................... 348/342; 359/321
(58) Field of Classification Search ............... 264/1.34; 348/321, 342; 359/321, 495, 497, 500; 252/299.01
See application file for complete search history.

(56) References Cited

U.S. PATENT DOCUMENTS

| | | | |
|---|---|---|---|
| 1,263,759 A | 4/1918 | Hanaway | |
| 2,469,958 A | 5/1949 | Fowler | |
| 2,797,696 A | 7/1957 | Fritsche | |
| 2,828,756 A | 4/1958 | Worley | |
| 2,950,727 A | 8/1960 | Dunn | |
| 2,986,150 A | 5/1961 | Torian | |
| 3,028,872 A | 4/1962 | Cresswell | |
| 3,165,110 A | 1/1965 | Brooks | |
| 3,361,144 A | 1/1968 | Folkes | |
| 3,415,260 A | 12/1968 | Hall | |
| 3,424,179 A | 1/1969 | Minot | |
| 3,469,587 A | 9/1969 | Folkes | |
| 3,534,511 A | 10/1970 | Cappella | |
| 3,692,354 A | 9/1972 | Tuerk | |
| 3,720,438 A | 3/1973 | Johnson et al. | |
| 3,780,477 A | 12/1973 | Sprung | |
| 3,875,623 A | 4/1975 | Johnston | |
| 3,961,638 A | 6/1976 | Huddle | |
| 3,979,782 A | 9/1976 | Lamb | |
| 4,118,904 A | 10/1978 | Sprung | |
| 4,137,687 A | 2/1979 | Sprung | |
| RE30,044 E | 7/1979 | Huddle | |
| 4,189,178 A | 2/1980 | Cramaro | |
| 4,235,654 A * | 11/1980 | Dohi et al. | ............... 156/99 |
| 4,328,853 A | 5/1982 | Gall et al. | |
| 4,583,331 A | 4/1986 | Hunt | |
| 4,583,777 A | 4/1986 | Myburgh | |
| 4,657,062 A | 4/1987 | Tuerk | |
| 4,711,484 A | 12/1987 | Tuerk | |

(Continued)

FOREIGN PATENT DOCUMENTS

DE    2257572    11/1972

(Continued)

*Primary Examiner*—Timothy J Henn
(74) *Attorney, Agent, or Firm*—Oliff & Berridge, PLC

(57) ABSTRACT

A high-polymer optical low-pass filter is produced by cutting out of a high polymer material achieving optical anisotropy diagonally relative to an optic axis thereof.

5 Claims, 5 Drawing Sheets

U.S. PATENT DOCUMENTS

| | | |
|---|---|---|
| 4,740,029 A | 4/1988 | Tuerk |
| 4,747,441 A | 5/1988 | Apolzer et al. |
| 4,773,191 A | 9/1988 | Slack |
| 4,800,947 A | 1/1989 | Loomis |
| 4,801,171 A | 1/1989 | Weaver |
| 4,841,688 A | 6/1989 | Rinaldi |
| 4,854,630 A | 8/1989 | Biancale |
| 4,902,064 A | 2/1990 | Tuerk et al. |
| 4,922,988 A | 5/1990 | Loomis |
| 5,026,109 A | 6/1991 | Merlot, Jr. |
| 5,080,422 A | 1/1992 | DeMonte et al. |
| 5,152,575 A | 10/1992 | DeMonte et al. |
| 5,578,243 A * | 11/1996 | Mazaki et al. ......... 252/299.01 |
| 5,820,779 A * | 10/1998 | Shouji et al. ........... 252/299.01 |
| 5,924,759 A | 7/1999 | DeMonte et al. |
| 6,025,958 A | 2/2000 | Yamaoka et al. |
| 6,327,085 B1 * | 12/2001 | Osawa et al. ................ 359/495 |

FOREIGN PATENT DOCUMENTS

| | | |
|---|---|---|
| DE | 2308436 | 2/1973 |
| DE | 25 19 365 | 11/1976 |
| JP | 09043542 A * | 2/1997 |
| JP | A-09-43542 | 2/1997 |
| JP | A-11-149015 | 6/1999 |
| JP | A-11-160653 | 6/1999 |
| JP | A 2001-75054 | 3/2001 |

* cited by examiner

HIGH-POLYMER OPTICAL LOW-PASS FILTER, METHOD FOR PRODUCING HIGH-POLYMER OPTICAL LOW-PASS FILTER, AND DIGITAL CAMERA

INCORPORATION BY REFERENCE

The disclosure of the following priority application is herein incorporated by reference:

Japanese Patent Application No. 2002-303257 filed Oct. 17 2002

BACKGROUND OF THE INVENTION

1. Field of the Invention

The present invention relates to a high-polymer optical low-pass filter, a method for producing a high-polymer optical low-pass filter, and a digital camera having the high-polymer optical low-pass filter.

2. Description of the Related Art

In an electronic image-capturing apparatus such as a digital still camera or a video camera, a subject image is captured by utilizing a solid image-capturing element (or sensor) that may be a CCD element or a MOS element. In such an image-capturing element, light-receiving pixels are arrayed in a regular pattern, and thus, the light-receiving pixel array pattern and the pattern of the subject image tend to cause a moire fringe, color artifacts or the like. Normally, these undesirable effects are eliminated by providing an optical low-pass filter in front of the image-capturing element.

The optical low-pass filter utilized in this application may be manufactured by, for instance, cutting out quartz or lithium niobate (LiNbO3) at a constant thickness along a specific direction. Such an optical low-pass filter takes advantage of the index ellipsoid structure of the crystal and effectively uses the birefringence achieved by tilting the crystallographic axis by a predetermined degree relative to the optical axis. When quartz is used to manufacture the optical low-pass filter, the quartz is cut diagonally at approximately 45 degrees relative to the optical axis. In this case, double images of the subject caused by the birefringence are projected onto the image-capturing element and the spatial frequency component corresponding to the separation width of the two images is cut off. The occurrence of a moire fringe can be prevented by adjusting the cut-off frequency to the light-receiving element array frequency.

However, the inorganic crystal such as quartz or lithium niobate that is used to constitute the optical low-pass filter manifests a piezoelectric effect as well as the optical anisotropy described above. For this reason, even a slight stress applied to the optical low-pass filter causes an electrical charge in the optical low-pass filter generating static electricity, which attracts dust suspended in the air to the filter surface. When the optical low-pass filter is disposed immediately in front of the image-capturing element, which is often the case, the image-capturing element captures an image of dust adhering to the optical low-pass filter as well as the subject image. Since the size of each pixel at the image-capturing element is smaller than 10 µm on each side, dust adhering to the optical low-pass filter which exceeds several tens of µm in size is bound to affect the image.

In particular, in a single-lens reflex type digital camera adopting a structure having a quick return mirror and a shutter provided immediately in front of the optical low-pass filter, the sliding gears and shutter blade generate particles from the coated surfaces, the metals and the like, and these particles become attracted to the surface of the optical low-pass filter having become charged with static electricity. In addition, if the surface of the optical filter is rubbed with a cloth or the like in order to remove the dust, a further electrical charge is induced and, as a result, the optical filter surface cannot be left in a dust free state.

A high polymer material may be used to constitute the optical low-pass filter as a way of preventing such an electrostatic charge. For instance, there is a birefringence type high-polymer optical low-pass filter in the known art achieved by using a diagonally oriented liquid crystal, as disclosed in Japanese Laid-Open Patent Publication No. 2001-75054.

However, when forming an optical low-pass filter by diagonally orienting a liquid crystal, the liquid crystal is oriented through rubbing or the like and thus, it is difficult to accurately orient the liquid crystal along a desired direction. In addition, there is a problem in that it is relatively difficult to achieve a uniform orientation of a liquid crystal having a sufficient thickness.

SUMMARY OF THE INVENTION

The present invention provides a technology whereby a high-polymer optical low-pass filter with a desired thickness, which achieves uniform optical anisotropy, is realized with ease and adherence of dust to the low-pass filter is prevented by utilizing the high-polymer optical low-pass filter in a digital camera.

A high-polymer optical low-pass filter according to the present invention is produced by cutting out of a high polymer material achieving optical anisotropy diagonally relative to an optic axis thereof.

A high-polymer optical low-pass filter according to the present invention is produced by (1) forming a laminated product by laminating a plurality of sheets of a high polymer material achieving optical anisotropy so as to align directions of the optic axes thereof and (2) cutting out of the laminated product diagonally relative to optic axes.

In these high-polymer optical low-pass filters, it is preferred that the high polymer material is a drawn material obtained by drawing in one direction a high polymer material achieving substantial optical isotropy.

Also, it is preferred that the high polymer material is a high-molecular polymer that is solidified with liquid crystal molecules oriented along a predetermined direction.

Also, it is preferred that a conductive coating is applied onto a surface of the high-polymer optical low-pass filter.

A digital camera according to the present invention comprises: an image-capturing element having a plurality of light-receiving pixels disposed in a regular pattern, onto which a subject light flux from a photographic optical system is projected; and the above high-polymer optical low-pass filter provided on an optical axis extending between the photographic optical system and the image-capturing element.

In these digital cameras, it is preferred that a plurality of high-polymer optical low-pass filters are disposed along the optical axis; and optic axes of the individual high-polymer optical low-pass filters extend along directions different from one another.

A method for producing a high-polymer optical low-pass filter according to the present invention comprises: a step of diagonally cutting out of a high polymer material achieving optical anisotropy relative to an optic axis of the high-polymer material.

A method for producing a high-polymer optical low-pass filter according to the present invention comprises: a step of forming a laminated product by laminating a plurality of sheets of a high polymer material achieving optical anisotropy so as to align optical axes thereof; and a step of cutting the laminated product diagonally relative to the optic axes.

In these methods for producing a high-polymer optical low-pass filter, it is preferred that there is further provided a step of forming the high polymer material achieving optical anisotropy by drawing a high polymer raw material substantially achieving optical isotropy along one direction.

A high-polymer optical low-pass filter according to the present invention comprises a laminated product formed by laminating a plurality of sheets of a high polymer material achieving optical anisotropy so as to align optic axes thereof, and the optic axes of the sheets of the high polymer material in the laminated product extend diagonally relative to an entrance surface of the high-polymer optical low-pass filter at which a light flux enters.

DESCRIPTION OF THE PREFERRED EMBODIMENTS

Figure 1:
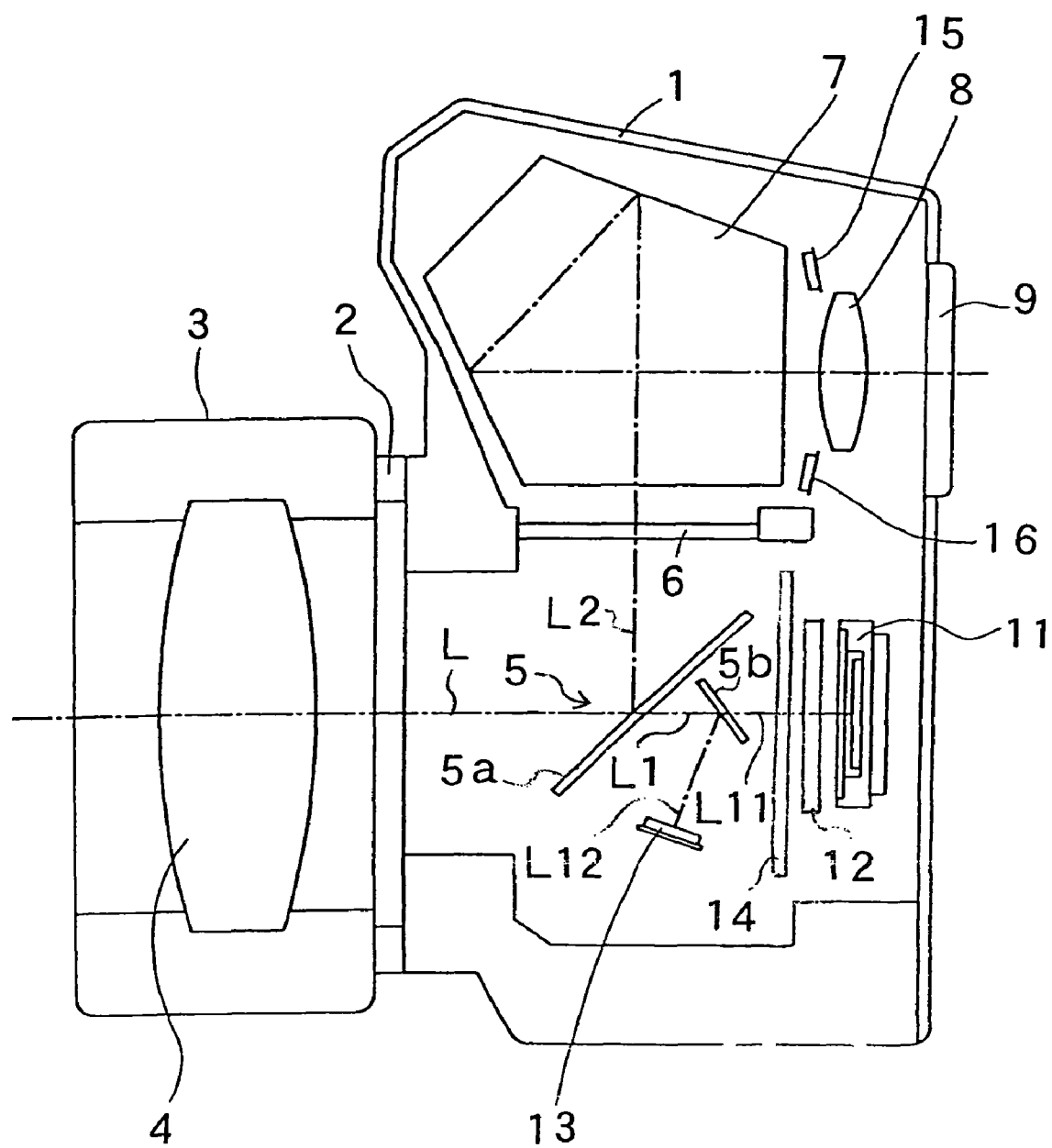
FIG. 1 illustrates an embodiment of the digital camera according to the present invention.

The following is an explanation of the embodiments of the present invention, given in reference to the drawings. FIG. 1, which illustrates an embodiment of the digital camera according to the present invention, is a schematic sectional view of the structure adopted in a single-lens reflex digital camera that allows lens exchange. An interchangeable lens 3 is mounted at a lens mount 2 of a digital camera 1. A photographic light flux L having passed through a photographic lens 4 of the interchangeable lens 3 enters a main mirror 5a at a quick return mirror 5. At the main mirror 5a constituted of a half mirror, the light flux L is separated into two light fluxes L1 and L2. The light flux L2 reflected at the main mirror 5a forms an image on a viewfinder screen 6. The subject image thus formed on the viewfinder screen 6 can be observed through a viewfinder eyepiece window 9 via a pentaprism 7 and an eyepiece lens 8. In addition, part of the light guided to the pentaprism 7 is further guided to a photometric sensor 15 and a calorimetric sensor 16.

On the rear side of the main mirror 5a, a sub-mirror 5b is provided. When a shutter release operation is not performed, the quick return mirror 5 is set at the position indicated in FIG. 1 and a part L12 of the light flux L1 having been transmitted through the main mirror 5a is reflected at the sub-mirror 5b and is then guided to a range-finding sensor 13. A subject image is formed on the range-finding sensor 13 which is provided at a position optically conjugate with the position of a CCD image-capturing element (or sensor) 11. When a shutter release operation is performed, the quick return mirror 5 is made to pop up and the light flux L1 passes through a shutter unit 14 in an open state and an optical low-pass filter 12 to form an image at the CCD image-capturing element 11.

As explained earlier, the optical low-pass filter 12, which removes a frequency component around the spatial frequency of the pixel lattice at the CCD image-capturing element 11 from the photographic light flux L, is provided to prevent moire and color artifact attributable to the regular arrangement of the pixels. While quartz, lithium niobate or the like is used as the optical material constituting the optical low-pass filter 12 in the related art, a high polymer material is instead used in the embodiment.

FIGS. 2A through 2D show manufacturing processes through which the optical low-pass filter 12 constituted of a high polymer material is typically manufactured. The high polymer material may be, for instance, a transparent resin such as polycarbonate. Since such a high polymer material hardly manifests any piezoelectric effect, the optical low-pass filter 12 does not become electrically charged even if stress is applied to the optical low-pass filter 12. For this reason, unlike an optical low-pass filter in the related art constituted of quartz or niobium-titanium, it does not attract suspended dust. The high polymer material constituting the optical low-pass filter in the embodiment may be any of various high polymer solid substances including polycarbonate mentioned above. The following explanation is given on the assumption that the high polymer material is polycarbonate.

Figure 2:
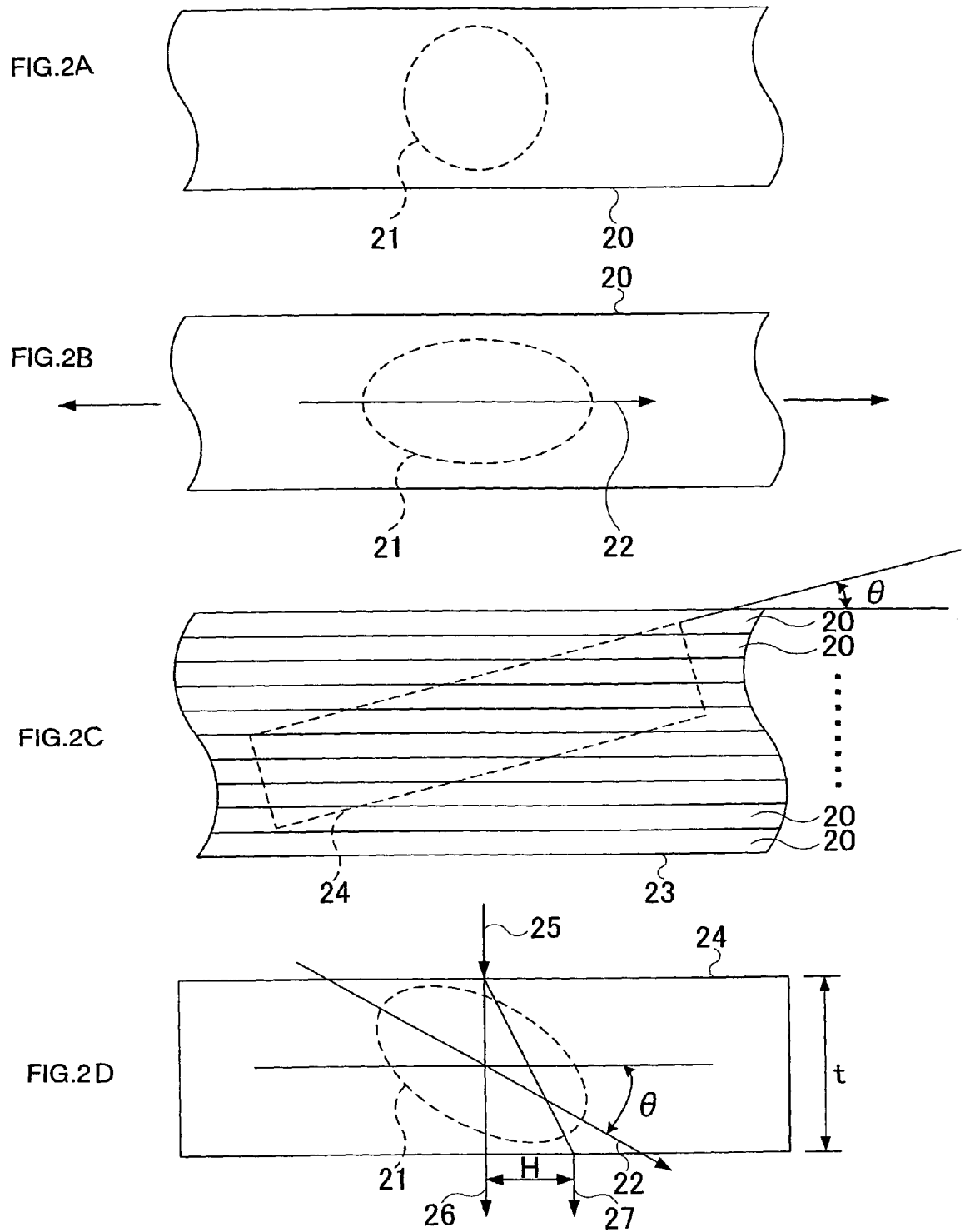
FIG. 2A illustrates the manufacturing processes through which the optical low-pass filter 24 is manufactured and particularly shows the characteristics of the polycarbonate material.
FIG. 2B illustrates the manufacturing processes through which the optical low-pass filter 24 is manufactured and particularly illustrates the drawing process.
FIG. 2C illustrates the manufacturing processes through which the optical low-pass filter 24 is manufactured and particularly illustrates the lamination and cutting process.
FIG. 2D illustrates the manufacturing processes through which the optical low-pass filter 24 is manufactured and particularly illustrates the characteristics of the optical low-pass filter 24 having been cut out.

A plastic material such as polycarbonate is optically isotropic under normal circumstances. FIG. 2A is a sectional view of a thin polycarbonate sheet 20. Since the polycarbonate sheet 20 is optically isotropic, its index ellipsoid 21 is perfectly round and does not demonstrate any birefringence characteristics. However, as the polycarbonate sheet 20 becomes drawn or stretched as indicated by the arrows in FIG. 2B, the index ellipsoid 21 assumes an elliptic shape elongated along the drawing direction. Thus, an optic axis 22 of the index ellipsoid 21 is oriented substantially along the drawing direction in which the polycarbonate sheet 20 is drawn.

Next, a plurality of polycarbonate sheets 20 having been drawn as shown in FIG. 2B are laminated and are pasted together with an adhesive that may be a UV setting resin (UV cured resin). An optical low-pass filter 24 is diagonally cut out of a laminated product 23 formed as described above. In FIG. 2C, the dotted line indicates a section of the optical low-pass filter 24 which is cut out so that the entry and exit surfaces of the optical low-pass filter 24 achieve a predetermined angle θ (>0) relative to the interface of the laminated product 23.

Since the optic axis 22 of the ellipsoid of revolution 21 at the optical low-pass filter 24 forms the angle θ relative to the entrance and exit surfaces as shown in FIG. 2D, in other words the optic axis 22 is inclined against the entrance and exit surfaces, the optical low-pass filter 24 demonstrates birefringence characteristics. As a result, when a light flux 25 enters the optical low-pass filter 24, the light flux 25 is separated into an ordinary ray 26 and an extraordinary ray 27. A separating width H over which these rays are separated from each other is the largest when the angle of the optic axis 22 relative to the incident light 25 is 45 degrees. It is to be noted that when $n_o$ represents the refractive index of the ordinary ray 26, $n_e$ represents the refractive index of the extraordinary ray 27 and t represents the thickness of the optical low-pass filter 24, the separating width H is expressed as in expression (1) below.

$$H=(n_e^2-n_0^2)t/2n_e n_0 \qquad (1)$$

Figure 3:
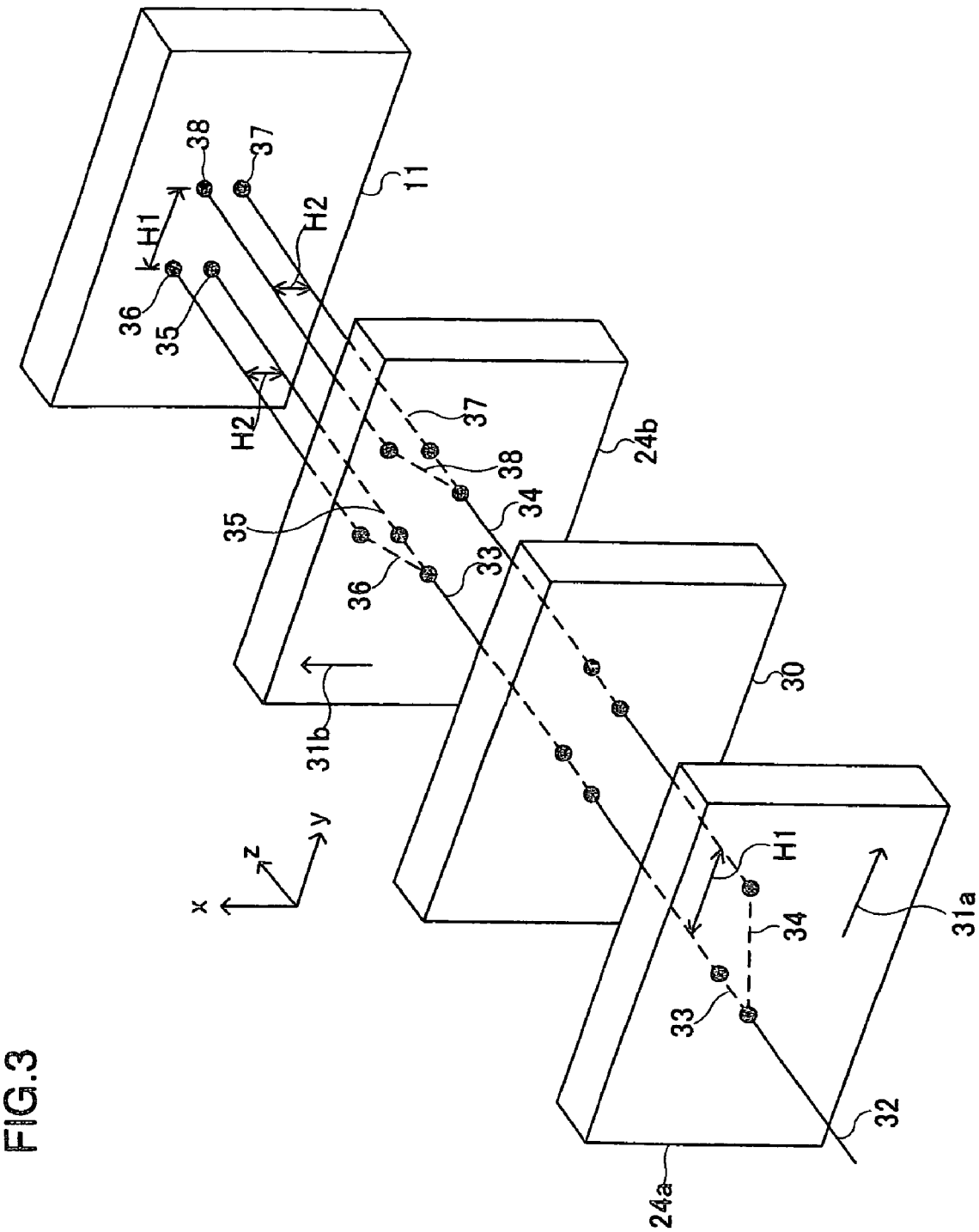
FIG. 3 illustrates the separating operation achieved by utilizing two optical low-pass filters 24a and 24b.

While the light flux 25 is separated into two light fluxes 26 and 27 in FIG. 2D, a light flux can be instead separated into four light fluxes along two directions by utilizing two optical low-pass filters 24a and 24b as shown in FIG. 3. It is to be noted that a quarter-wave plate 30 is provided between the optical low-pass filter 24a and the optical low-pass filter 24b. In FIG. 3, a light flux (subject light flux) 32 advances along a z axis, and the entry surfaces of the optical low-pass filters 24a and 24b, the quarter-wave plate 30 and the CCD image-capturing element 11 are all set parallel to an xy plane. Arrows 31a and 31b indicate the projections of optic axis 22 of the index ellipsoids 21 of the optical low-pass filters 24a and 24b onto the xy plane. Namely, the optic axis 22 of the optical low-pass filter 24a is present within the yz plane and extends along the y axis when viewed from the direction in which the light flux enters. The optic axis 22 of the optical low-pass filter 24b, on the other hand, is present within the xz plane and extends along the x axis when viewed from the direction in which the light flux enters.

The light flux 32 is separated into two light fluxes, i.e., a light flux (ordinary ray) 33 and a light flux (extraordinary ray) 34 at the optical low-pass filter 24a. The light flux 32 is separated into two rays along the y direction over a separating width H1. The light fluxes 33 and 34 are linearly polarized rays perpendicular to each other. The quarter-wave plate 30 is disposed so that the optic axis is tilted by 45 degrees relative to the oscillating direction of the light fluxes 33 and 34. Thus, as the light fluxes 33 and 34 pass through the quarter-wave plate 30, the light fluxes which are both linearly polarized light are converted to circularly polarized light.

The circularly polarized light fluxes 33 and 34 exiting the quarter-wave plate 30 then enter the second optical low-pass filter 24b. Since the optical axis of the optical low-pass filter 24b extends along the x direction, the light fluxes 33 and 34 are each separated along the x direction, with the light flux 33 separated into light fluxes 35 and 36 and the light flux 34 separated into light fluxes 37 and 38. The light fluxes 35 and 37 are respectively separated from the light fluxes 36 and 38 over a width H2. The separating widths H1 and H2 are equal to each other if both the angles of inclination θ of the optic axis 22 and the thicknesses t of the optical low-pass filters 24a and 24b are equal to each other.

The individual pixels are arrayed two-dimensionally along the x direction and the y direction at the CCD image-capturing element 11, and the frequency component corresponding to the pixel pitch can be eliminated from the subject light flux 32 by, for instance, adjusting the thicknesses of the optical low-pass filters 24a and 24b so as to match the separating widths H1 and H2 with the pitches with which the pixels are arrayed along the x direction and the y direction at the CCD image-capturing element 11. As a result, the occurrence of a moire fringe can be prevented. Furthermore, since the optical low-pass filters 24, 24a and 24b in the embodiments are constituted by using a high polymer material, no electrostatic charge due to the piezoelectric effect as would occur in an optical low-pass filter constituted of quartz occurs and thus dust is not attracted to these optical low-pass filters during an operation of the shutter unit 14 and the like.

Examples of Variations

Figure 4:
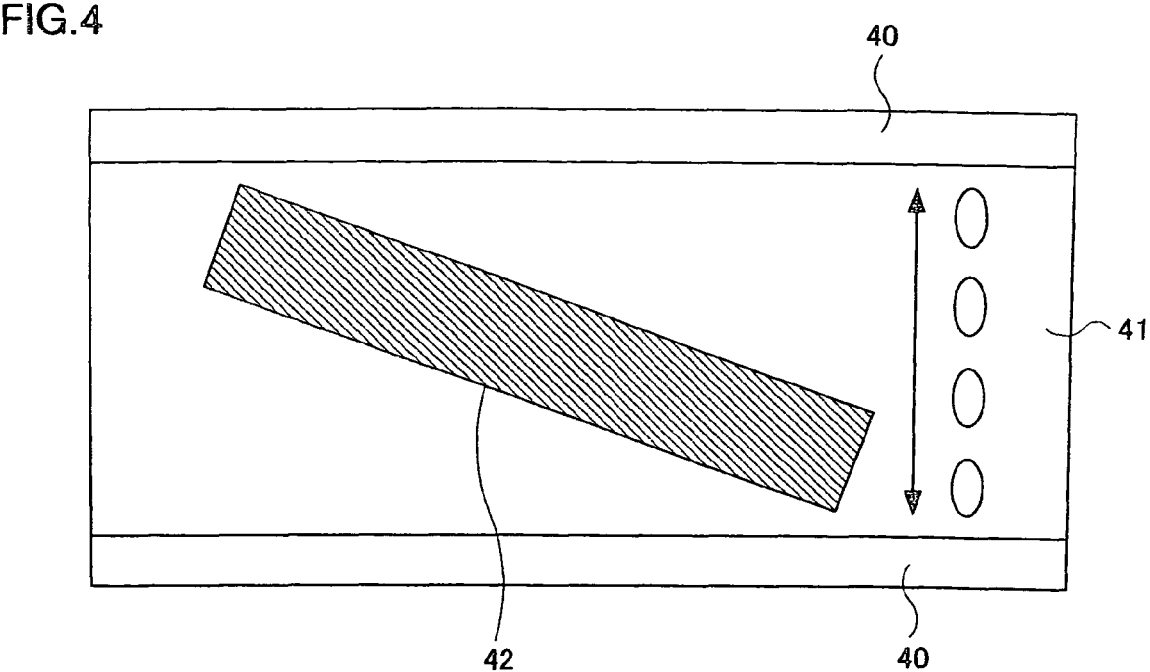
FIG. 4 shows a variation of the optical low-pass filter.

While the optical low-pass filters 24, 24a and 24b are produced by using a drawn high polymer material in the embodiments described above, a liquid crystal may be instead used as the filter material. In such a case, the liquid crystal may be oriented along a specific direction and its orientation characteristics may be fixed by solidifying the liquid crystal with a polymer or the like. FIG. 4 shows a liquid crystal in such an application. First, glass substrates 40 with an oriented film (an alignment film) coated onto their liquid crystal contact surfaces undergo rubbing processing. Next, a liquid crystal/monomer mixture prepared by mixing together a liquid crystal and a UV setting monomer is injected between these glass substrates 40. Due to its self organizing property, the liquid crystal arranges itself as shown in FIG. 4. While the liquid crystal is oriented along the vertical direction in FIG. 4, it may be oriented along the horizontal direction in the figure so as to run parallel to the glass substrates 40.

Subsequently, UV light is irradiated to set the UV setting monomer in the liquid crystal/monomer mixture and, as a result, the liquid crystal becomes solidified while sustaining the state of orientation shown in FIG. 4, i.e., while sustaining its optical anisotropy. After the liquid crystal is solidified, the glass substrates 40 are peeled off and a liquid crystal-containing high polymer sheet 41 having become solidified is cut out diagonally, thereby forming an optical low-pass filter 42. This optical low-pass filter 42 achieves filter characteristics similar to those of the optical low pass filters 24, 24a and 24b explained earlier. It is to be noted that since a certain limit is set with respect to the thickness of the liquid crystal-containing high-molecular polymer sheet 41 that can be manufactured through this method so as to assure the desired orientation characteristics of the liquid crystal, a laminated product may be instead formed by laminating a plurality of sheets of liquid crystal-containing high-molecular polymer sheets 41 and an optical low-pass filter may be formed by diagonally cutting out the laminated product.

Figure 5:
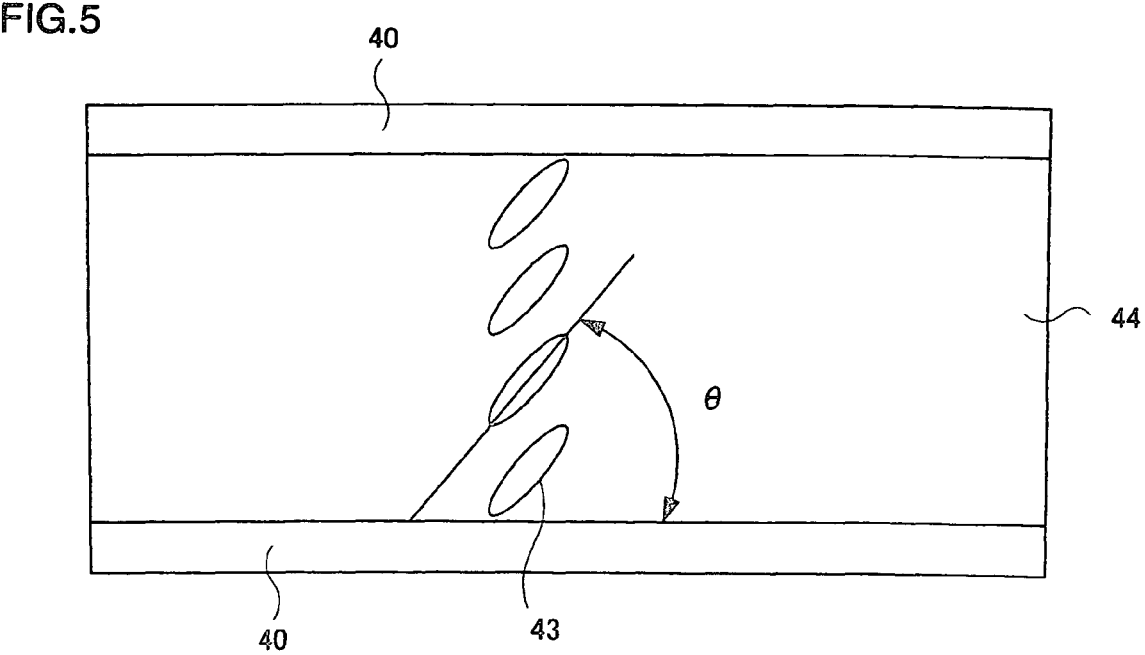
FIG. 5 shows a second variation of the optical low-pass filter.

Alternatively, the polymer may be set with UV by diagonally orienting liquid crystal molecules 43 at an angle θ relative to the glass substrate surfaces as shown in FIG. 5. In this case, a liquid crystal-containing high-molecular polymer 44 manifests optical anisotropy relative to a light flux entering perpendicular to a glass substrate 40. Thus, the polymer can be directly it utilized as an optical low-pass filter. The polymer can be used as an optical low-pass filter either after peeling off the glass substrates 40 or without removing the glass substrates 40.

Figure 6:
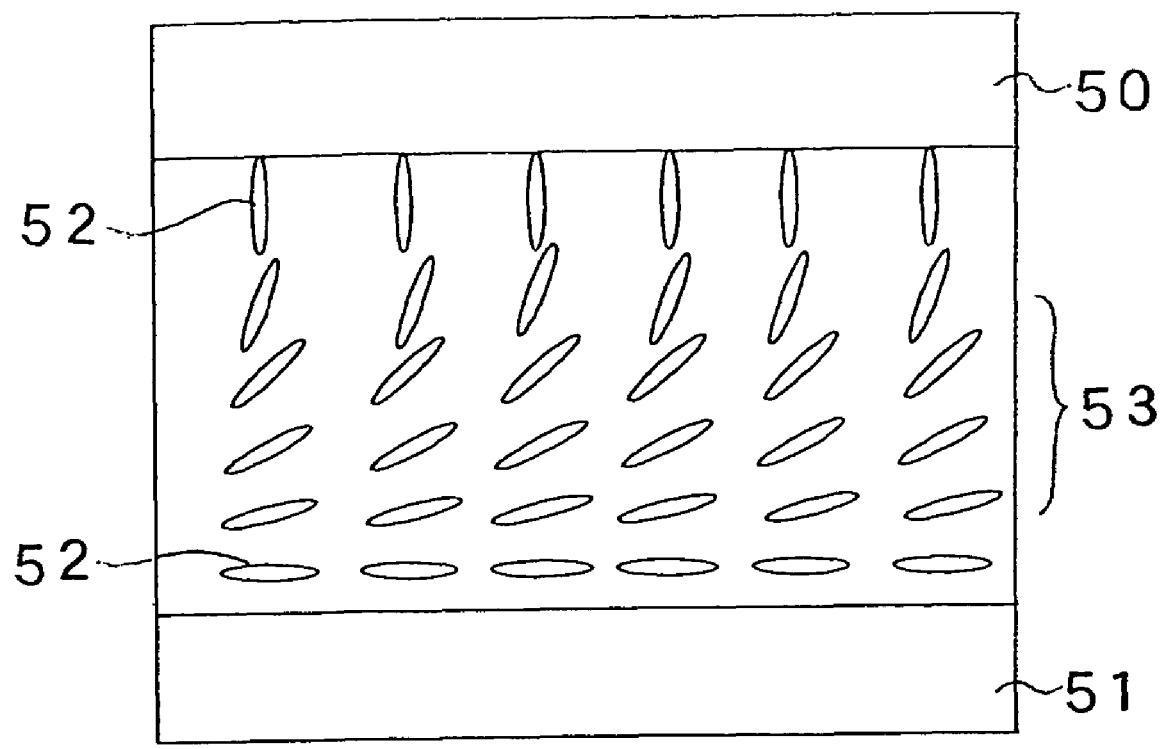
FIG. 6 shows a third a variation of the optical low-pass filter.

As a further alternative, liquid crystal molecules 52 at an upper glass substrate 50 may be oriented along a direction different from the direction along which liquid crystal molecules 52 are oriented at a lower glass substrate 51 to orient liquid crystal molecules 52 diagonally in a middle area 53, as shown in FIG. 6. When a light flux enters an optical low-pass filter constituted of the polymer oriented as described above along the vertical direction in the figure, advantages similar to those achieved in the optical low-pass filter having liquid crystal molecules oriented diagonally shown in FIG. 5 are realized.

However, uniform orientation can be achieved more readily by orienting liquid crystal molecules along the vertical direction as shown in FIG. 4 or along the horizontal direction rather than by diagonally orienting liquid crystal molecules as shown in FIG. 5 or FIG. 6. In addition, when an optical low-pass filter is cut out diagonally as shown in FIG. 4, a higher degree of accuracy is achieved with regard to the angle θ of the optical axis than in an optical low-pass filter having diagonally oriented liquid crystal molecules.

It is to be noted that the antistatic performance can be further enhanced by applying a conductive coating onto the surfaces of the optical low-pass filters 24, 24a, 24b and 42.

For instance, even if static electricity is generated as the optical low-pass filters 24, 24a, 24b and 42 are wiped with a cloth or the like, the static electricity can be discharged toward the camera main unit through the conductive coating.

While the optical low-pass filter 24 is cut out of the laminated product 23 achieved by laminating the polycarbonate sheets 20 in the embodiment described above, the optical low-pass filter 24 may be instead cut out of a single non laminated polycarbonate sheet if the drawn polycarbonate sheet still achieves a thickness great enough to assure the thickness t for the optical low-pass filter 24. Alternatively, only portions of the liquid crystal-containing high-molecular polymer sheet 41 (see FIG. 4) obtained by orienting the molecules along a single direction, where a uniform orientation is achieved, may be laminated and an optical low-pass filter may be cut out of such a laminated product. Since only the portions where a uniform orientation is achieved in the liquid crystal-containing high-molecular polymer sheets 41 are used, a high-performance optical low-pass filter is obtained in this case.

While an explanation is given above in reference to the embodiments on an example in which the present invention is adopted in an optical low-pass filter in a digital camera, the high-polymer optical low-pass filter according to the present invention may be adopted in any other imaging apparatus as well as a digital camera as long as the imaging apparatus includes an image-capturing element having pixels disposed in a regular pattern.

As explained above, according to the present invention, a high-polymer optical low-pass filter achieving a desired angle of orientation can be obtained readily by adjusting the angle at which it is cut out. In addition, a high-polymer optical low-pass filter with a uniform orientation and achieving a desired thickness can be obtained readily by adjusting the cut out angle and the number of layers of polymer sheets used to constitute the laminated product. By using such a high-polymer optical low-pass filter in a digital camera, adherence of dust and the like to the optical low-pass filter can be prevented.

The above described embodiments are examples, and the various modifications can be made without departing from the spirit and scope of the invention.

What is claimed is:

1. An optical low-pass filter, comprising:
   a laminated product formed by laminating a plurality of sheets of a polymer material achieving optical anisotropy so as to align directions of the optic axes thereof; and
   a plurality of interfaces of the laminated product each making a predetermined angle, which is more than 0 degrees, relative to an entrance surface of the optical low-pass filter where light flux enters,
   wherein each of the interfaces of the laminated product is formed between two laminated sheets of the polymer material and extends diagonally relative to the entrance surface of the optical low-pass filter.

2. An optical low-pass filter according to claim 1, wherein the polymer material is a drawn material obtained by drawing in one direction a polymer material achieving substantial optical anisotropy.

3. An optical low-pass filter according to claim 1, wherein the polymer material is solidified with liquid crystal molecules oriented along a predetermined direction.

4. An optical low-pass filter according to claim 1, wherein a conductive coating is applied onto the surface of the polymer optical low-pass filter.

5. An optical low-pass filter according to claim 1, wherein the laminated product is produced by:
   (1) forming a first laminated product by laminating a plurality of sheets of the polymer material so as to align the directions of the optic axes thereof; and
   (2) cutting the first laminated product diagonally relative to the optic axes so that the interface of the laminated product makes the predetermined angle relative to the entrance surface of the optical low-pass filter.

* * * * *